United States Patent [19]
Harder

[11] 3,767,887
[45] Oct. 23, 1973

[54] CAPACITOR-DISCHARGE STUD WELDING APPARATUS

[75] Inventor: Karl-Max Harder, Vaduz, Liechtenstein

[73] Assignee: Hilti Aktiengesellschaft, Schaan, Liechtenstein

[22] Filed: Apr. 6, 1972

[21] Appl. No.: 241,667

[30] Foreign Application Priority Data
Apr. 14, 1971 Germany................... P 21 17 996.4

[52] U.S. Cl.............................. 219/98, 219/113
[51] Int. Cl. ..... B23k 9/20, B23k 11/04, H02h 3/28
[58] Field of Search........................ 219/97, 98, 113

[56] References Cited
UNITED STATES PATENTS

| | | | |
|---|---|---|---|
| 3,291,958 | 12/1966 | Glorioso | 219/98 |
| 3,355,570 | 11/1967 | Glorioso | 219/98 |
| 3,479,481 | 11/1969 | Van Gulik | 219/98 |
| 3,532,851 | 10/1970 | Glorioso | 219/98 |
| 3,551,786 | 12/1970 | Van Gulik | 219/98 X |
| 3,564,192 | 2/1971 | Pease et al. | 219/98 |

Primary Examiner—R. F. Staubly
Attorney—David Toren et al.

[57] ABSTRACT

In the stud welding apparatus disclosed a battery or bank of capacitors in the main welding line stores welding energy. A current supply unit charges the bank of capacitors. An electronic switch applies the energy from the bank of capacitors to welding electrodes. A control device, which can be turned on and off, renders the electronic switch conductive when it is turned on. A safety circuit reduces the output voltage of the current supply unit when the electronic switch happens to turn on while the control device is turned off. The safety circuit also reduces the voltage across the bank of capacitors.

29 Claims, 6 Drawing Figures

CAPACITOR-DISCHARGE STUD WELDING APPARATUS

BACKGROUND OF THE INVENTION

This invention relates to welding apparatuses, and in particular stud welding apparatuses which depend upon capacitor discharges.

In such apparatuses a bank or battery of capacitors in the main welding line stores the welding energy. A current supply unit charges the capacitor bank. An electronic switch in the main welding line controls flow of energy from the capacitor battery to the welding electrodes, and a control device controls the state of the electronic switch.

Electronic switching elements, particularly semiconductor switching elements occasionally become conductive accidentally without being started. At other times they fail to return to their non-conductive state even when the normal operating voltages would render them non-conductive. Un-intentional triggering may result from accidental electrostatic charges or the inductance of welding apparatuses in which such electronic switching elements are used. On the other hand, excessive current surges, such as may be encountered in welding apparatuses, may be responsible for failure of the switching elements to return to their blocked or non-conductive state.

In stud welding apparatuses of the above-mentioned type, a thyristor or plurality of thyristors are used as electonic switches for controlling the appropriate welding circuit. In such welding apparatuses measures are usually taken to make sure that the welding current can be initialled only when the mounting for the welding electrodes or elements, or the welding electrodes or elements themselves, are properly placed on the workpiece. This avoids any danger to the operator when the the current is turned on. However, if the thyristor or plurality of thyristors which control the welding current have failed to return to the non-conductive or blocked state after carrying a welding current, the voltage of the current source or the voltage of the battery of capacitors remains between the welding electrodes or terminals. Depending upon the welding circuits used, such a voltage can reach several hundred volts. This type of voltage represents a substantial hazard for the operator and may result in serious accidents.

Moreover, stud welding apparatuses frequently do not remain stationary while in use. For example, in assembly operations they are composed of a hand-guided welding gun, a largely portable device for generating the welding current, and the necessary connecting cables. Such assembly operations frequently involve work conditions which are intrinsically hazardous. The unexpected appearance of a voltage between the welding electrodes, even if the voltage is not inherently dangerous, would increase the likelihood of accidents and thus magnify the hazard. However, within reasonable expenditure limits, it is difficult to protect operators from contact with welding electrodes.

In order to avoid such a substantial hazard, care must be taken to avoid the unintentional generation of directly or indirectly hazardous voltages between the electrodes of a stud welding apparatus. In particular, it is important to prevent such hazardous voltages from appearing when the control device controlling the switching element is not turned on. On the other hand, if such unintentional voltages appear it is important that they be eliminated as soon as possible.

SUMMARY OF THE INVENTION

According to a feature of the invention, these disadvantages are overcome by providing circuit means responsive to the electronic switch being in the conductive state and the control device not being turned on, for reducing the output voltage of the current supply unit.

According to another feature of the invention, the circuit means also reduces the voltage at the battery of capacitors. The circuit means may also be protective means.

According to still another feature of the invention, the circuit means entirely eliminates one or both of these voltages.

If the electronic switch fails to return to its non-conductive or blocked state after the conductive device has been turned off, it is sufficient merely to reduce or cut off the voltage of the current supply unit. The capacitor battery, that is, the battery of capacitors, could then no longer charge, or could only charge to a harmless voltage. Thus, accident hazards would be avoided. However, if the electonic switch becomes conductive during the charging of the battery of capacitors, cutoff or reduction of the output voltage of the capacitor-charging current supply would not afford sufficient security because the battery or bank capacitors could be charged to some degree. Thus, a hazardous voltage might already be formed between the welding electrodes. For this reason, the voltage at the capacitor bank is reduced or eliminated as soon as possible.

According to another feature of the invention, the circuit means forms a short circuit across the current supply unit through the electronic switch when the control device is not turned on.

According to another feature of the invention, the control means includes a cutoff device which turns off the electronic switch during flow of short circuit current.

According to another feature of the invention, the contol device includes a relay which closes the short circuit in response to the control device being turned off. Normally, the electronic switch which forms part of the short circuit path, interrupts the short circuit current by its usual cutoff. If the electronic switch then becomes conductive or remains conductive, when the control device is no longer turned on, the short circuit current to which the cutoff device responds, flows immediately. The output voltage of the current supply is thus rapidly disconnected.

According to another feature of the invention, the circuit means has an auxiliary switch connected across the electrodes. The auxiliary switch is opened when the control device is turned on and closed when the control device is turned off. The welding electrodes are thus always short circuited when no welding current is to flow. Should the electronic switch then become unintentionally conductive, no hazardous voltage appears between the welding electrodes. At the same time, the capacitor battery is discharged and the cutoff device responds.

According to another feature of the invention, the auxiliary switch is a thyristor or a mechanical switch controlled by a contactor.

According to another feature of the invention, a disconnector is arranged in series with the electrodes in the welding lines. The disconnector is closed only when welding current is to flow. The disconnector would have to carry the entire welding current during the welding operation. Its contacts could be damaged and become sticky as a result of such heavy current flow. Thus, it would not be possible to rely upon opening of the disconnector while a welding current flows or until the current has been cut off.

According to another feature of the invention, the circuit means includes a switching mechanism with a switch that can be released by a voltage sensor. The switch of the switching mechanism is connected into the short circuit path which contains the current supply unit and the electronic switch. A cutoff device which responds when a short circuit current flows is provided for the current supply unit. The switching mechanism is only effective if the control device is not turned on. The voltage sensor for releasing the switch responds only when the electronic switch is conductive.

The short circuit path which is exposed to high thermal and mechanical stresses is kept very small and laid out to withstand these stresses.

According to another feature of the invention, the switching mechanism includes a thyristor whose control electrode is connected to a voltage sensor in the form of a voltage divider circuit arranged parallel to the series connection composed of the electronic switch and the capacitor battery. The voltage sensor can, of course, assume other forms as is known in the art.

According to another feature of the invention, a current sensor is used.

According to another feature of the invention, the cutoff device is in the form of a fuse. Preferably, a quick action safety fuse is used because it can effect an extremely rapid dicconnection. Such a fuse can be readily replaced at little disconnection. and requires very little space while weighing very little. Mechanical switch contacts, on the other hand, would be very complicated, large and heavy if they are not to be destroyed while breaking of the short circuit current.

According to another feature of the invention, the circuit means forms an auxiliary discharge circuit when the control device is not turned on. The auxiliary discharge circuit contains the capacitor battery, the electronic switch, and a discharge resistance. The discharge circuit allows rapid elimination of the voltage across the battery. This is important because the battery of capacitors may already be charged when the electronic switch inadvertently becomes conductive.

According to another feature of the invention, an additional set of contacts of the above mentioned relay form a part of the discharge circuit for short circuiting the supply current unit. The resistance value of the discharge resistance is selected so that the voltage of the capacitor battery is reduced to a harmless value at a rapid rate, but without unduly stressing the switching elements in the discharge circuit.

According to yet another feature of the invention, the discharge resistance is preferably the charging resistor of the charging circuit of the capacitor battery. By using the available charging resistor as a discharge resistance, it is possible to save one resistor.

According to another feature of the invention, a switch replacing the electronic switch is arranged in the discharge circuit of the capacitor battery. In this way, both the voltage of the current supply and the voltage of the capacitor battery can be reduced simultaneously by the switching mechanism.

According to yet another feature of the invention, the circuit means includes an overload safety device which releases the switch of the switching mechanism when the voltage of the capacitor battery exceeds a predetermined maximum permissible value. Such circuit means reduces the risk of allowing the electronic switch accidently to pass into the conductive state.

According to yet another feature of the invention, the current supply unit includes built-in means for current limiting. Preferably the current supply unit includes a transformer with loose coupling. According to a feature of the invention, such a transformer is a leakage reactance transformer. A transformer of this type limits the currents which can flow in the secondary winding. At the same time the voltage across the secondary winding is substantially reduced when the secondary winding of the transformer is subjected to short circuiting over the discharge circuit, such as would occur if the electronic switch should accidently become conductive. Under these circumstances, it is no longer necessary to cut off the charging current supply unit in response to failure of the electronic switch. At the same time, it is possible to use relatively small switching elements in the safety circuit.

These and other features of the invention are pointed out in the claims. Other objects and advantages of the invention will become obvious from the following detailed description when read in light of the accompanying drawings.

DETAILED DESCRIPTION OF THE PREFERRED EMBODIMENTS

Figure 1:
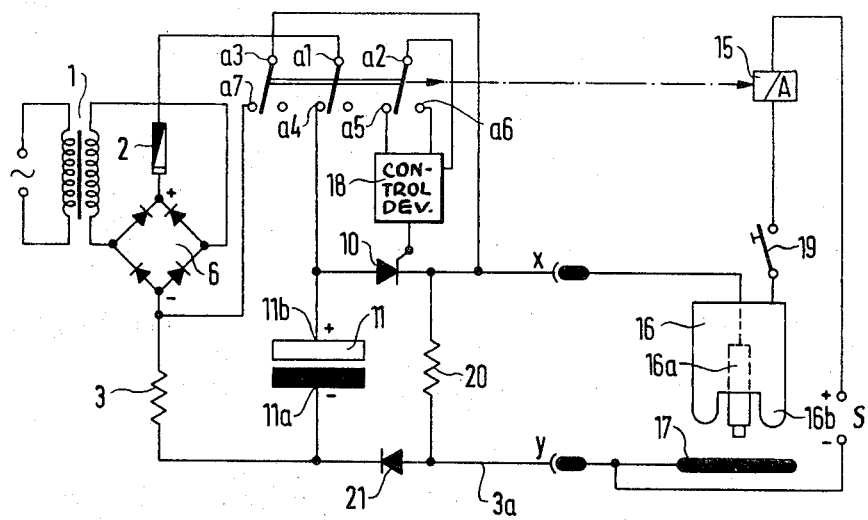
FIG. 1 is a schematic circuit diagram illustrating a stud welding apparatus with a voltage protecting circuit and embodying features of the invention.

In FIG. 1, a transformer 1 receives power from an alternating current line and energizes a rectifier bridge 6. The bridge 6 charges a capacitor battery 11, i.e., a bank or battery of capacitors, through a fuse 2, an armature $a1$, a contact $a4$, and a series charging resistance 3.

The armature $a1$ and contact $a4$ form part of a relay 15 which is shown in its normally unenergized state. When the relay 15 assumes the normally unenergized position shown, the armature $a1$ rests against the contact $a4$.

The capacitor battery serves to furnish a welding current to a welding gun 16. The welding gun includes a welding electrode 16a which is pressed against a second electrode 17 formed of the material to which a stud is to be welded. The capacitor battery 11 produces the welding current by discharging from its positive terminal 11b, through a thyristor 10, a connecting terminal or plug x, the electrode 16a, the electrode 17, a connecting terminal or plug y, a line 3a, and a diode 21 to a negative terminal 11a.

The thyristor 10 forms an electronic welding switch. A resistor 20 between the cathode of the thyristor 10 and a line 3a forms an auxiliary load for shunting normal residual or leakage currents through the thyristor 10 when the thyristor is in its non-conductive state. This prevents buildup of voltage between the welding electrodes due to the leakage of current through the thyristor 10.

A control device 18 for igniting and extinguishing the thyristor is connected to the control electrode of the thyristor 10. The control device 18 constitutes a triggering and extinguishing system. An armature a2 of the relay 15 can turn the control device 18 on or off, that is to a connected or disconnected state, by switching the armature a2 between two contacts a5 and a6.

An armature a3 of relay 15 rests against a contact a7 when the relay is unenergized. The armature a3 and contact a7 connect the cathode of thyristor 10 to the negative output of the rectifier bridge 6 to which the charging resistance 3 is also connected. A current source S initiates the welding current by energizing the relay 15 through the switch 19, the attached welding electrode 16b, and the base material 17. The relay 15 can trip only when switch 19 is closed and when the legs of the welding gun 16 are electrically connected with the workpiece 17.

For welding, the welding element or stud of the gun 16 must also electrically contact the base material 17 so as to close the welding circuit.

The circuit of FIG. 1 operates as follows.

The bridge 6 charges the capacitor battery 11 through the elements 2, a1, a4, and 3. To start welding the electrodes 16a and 16b are placed into contact with the base material 17. The switch 19 is then closed.

Closing of the switch 19 energizes the relay 15 and draws the armatures a3 and a1 away from the contacts a7 and a4. This stops charging of the capacitor battery 11. Energization of the relay 15 also switches the armature a2 from the contact a5 to the contact a6. This turns on the control device and ignites the thyristor 10. Welding current then flows from the capacitor battery 11 through the thyristor 10, the electrode 16a, the base material 17, and a diode 21 in the line 3a of the welding path.

The diode 21 prevents the bridge 6 from charging a previously discharged capacitor battery 11 through the fuse 2, armature a1, contact a4, terminal 11a, resistor 20, armature a3, and contact a7, when the relay 15 is unenergized. It prevents the bridge voltage from appearing across the welding electrodes.

After the switch 19 is open, the relay 15 drops out again. That is to say, it becomes unenergized. The armatures a1 and a3 then contact the contact a4 and a7 while the armature a2 switches over to contact a5. The latter action turns off the control device 18 and restores the thyristor 10 to its non-conductive state. At the same time, the capacitor battery is connected across the bridge 6 through the fuse 2, the armature a1, the contact a4, and the resistance 3.

Under certain circumstances the thyristor 10 does not return to its non-conductive state despite its being switched off by the control device. On the other hand, the thyristor 10 may accidently become conductive any time after it is switched off when the capacitor battery is charged to some degree. In these cases the positive pole of the bridge 6 becomes short circuited through the fuse 2, the armature a1, the contact a4, the conducting thyristor 10, the armature a3, the contact a7, the negative pole of the rectifier bridge 6. Depending upon the character of the fuse, it will react more or less spontaneously to the resulting short circuit by blowing out or disconnecting.

At the same time, the battery 11 is shunted from the terminal 11b to the terminal 11a by the conducting thyristor 10, the armature a3, the contact a7, and the charging resistance 3. Thus, battery 11 discharges rapidly over the resistance 3. Consequently, no harmful voltage to the operator can form between welding plugs x and y when thyristor 10 accidently becomes conductive. The supply current is shunted and interrupted and the capacitor battery is discharged.

Figure 2:
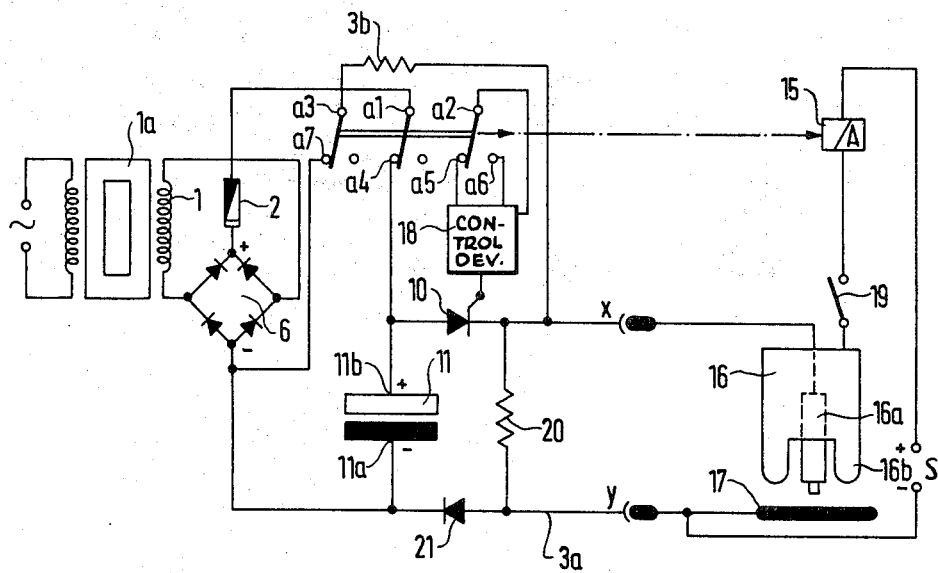
FIG. 2 is a schematic circuit diagram illustrating another embodiment of the invention wherein the transformer of FIG. 1 is replaced with a current-limiting transformer.

The embodiment of FIG. 2 is very similar to the embodiment of FIG. 1. However, in contrast to FIG. 1, FIG. 2 includes the transformer 1a in place of the transformer 1. The transformer 1a is a current-limiting transformer, specifically a leakage reactance transformer. Also, in FIG. 2, the line 3a is connected directly to an output terminal of the rectifier bridge circuit 6 and a discharge resistance 3b appears in the line between the armature a3 and the cathode of thyristor 10.

By virtue of this construction the transformer 1a can deliver currents whose values never exceed a predetermined maximum. For this reason, it is possible to eliminate the charging resistance 3 in the charging circuit of the capacitor battery 11. One of the particular advantages of this circuit lies in the fact that, as the capacitor battery starts to charge, the limited maximum current of the transformer slows the voltage rise. This increases the time available to permit the switching mechanism to become operative. This is important when, for example, the fuse 2 at the rectifier bridge is in the form of a relay fuse. The additional time may be sufficient to allow such a relay fuse to operate. Such a relay fuse can, for example, disconnect the transformer from the main.

Thus, according to the embodiment of the invention the fuse 2 is in the form of a relay fuse which opens contacts, not shown, between the primary of transformer 1a and the source, main or supply line.

Figure 3:
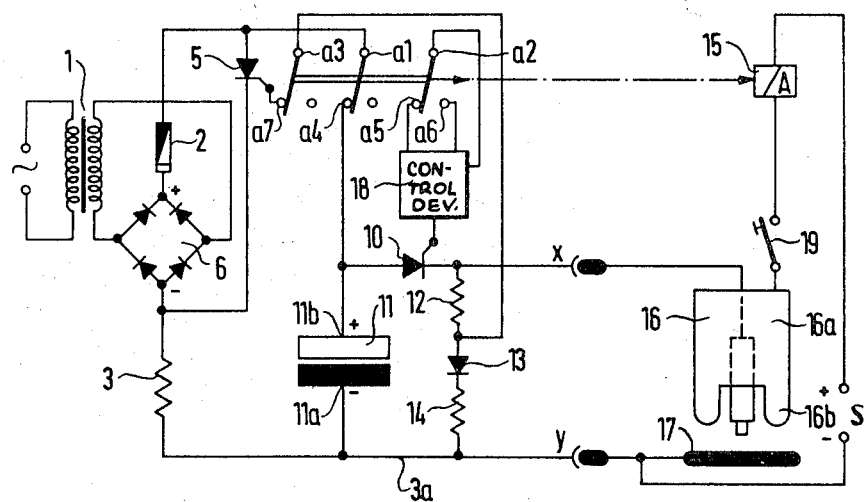
FIG. 3 is a schematic circuit diagram illustrating another apparatus embodying features of the invention.

The embodiment of the invention illustrated in FIG. 3 utilizes a voltage sensor between the welding lines. In contrast to the embodiment of FIG. 1, a short circuit path controlled by a thyristor 5 shunts the rectifier bridge 6 and the fuse 2. The resistor 20 of FIG. 1 is replaced by a voltage divider circuit having resistances 12 and 14 and a diode 13. The voltage appearing at the junction of the resistance 12 and the diode 13 is applied to the control terminal through the armature a3 and contact a7 of relay 15 to control the thyristor 5. The diode 13 prevents current from surging to the capacitor battery 11 when it is completely discharged, and the charging current is switched on. Such a current would otherwise flow from the bridge 6, through the fuse 2 through the armature $a1$, contact $a4$, the capacitor 11, the resistor 14, the armature $a3$, the contact $a7$, and the control electrodes of thyristor 5 to the negative terminal of the bridge 6. Such a current surge would turn on the thyristor 5. The diode 13 prevents the thyristor 5 from being turned on in this undesired manner.

If the thyristor 10 works properly, the method of operation according to FIG. 3 corresponds exactly to that of FIG. 1. However, if the thyristor 10 remains either conductive after switch 19 has been opened, or becomes conductive while switch 19 is open, a voltage appears at the junction of resistor 12 and diode 13 in the voltage divider. The armature $a3$ contacting the contact $a7$ applies this voltage to the control electrode of the thyristor 5. This renders the thyristor 5 conductive. The thyristor 5 then forms a short circuit across the bridge and the fuse 2.

The short circuit current causes fuse 2 to respond. This interrupts the charging circuit of the capacitor battery 11. In addition, the thyristor 5 discharges the capacitor battery 11 by shunting current through the contact $a4$, the armature $a1$, and the resistance 3.

This embodiment makes it impossible for a dangerous voltage to appear between the welding electrodes and at plugs $x$ and $y$ while the electrodes are not connected with each other electrically. If the thyristor 10 should accidently become conductive any resulting voltage is immediately eliminated.

The circuit of FIG. 3, when compared to the circuits of FIGS. 1 and 2, has the advantage that the elements $a1$ and $a4$ need not carry very high short circuit currents before the fuse 2 burns out.

Figure 4:
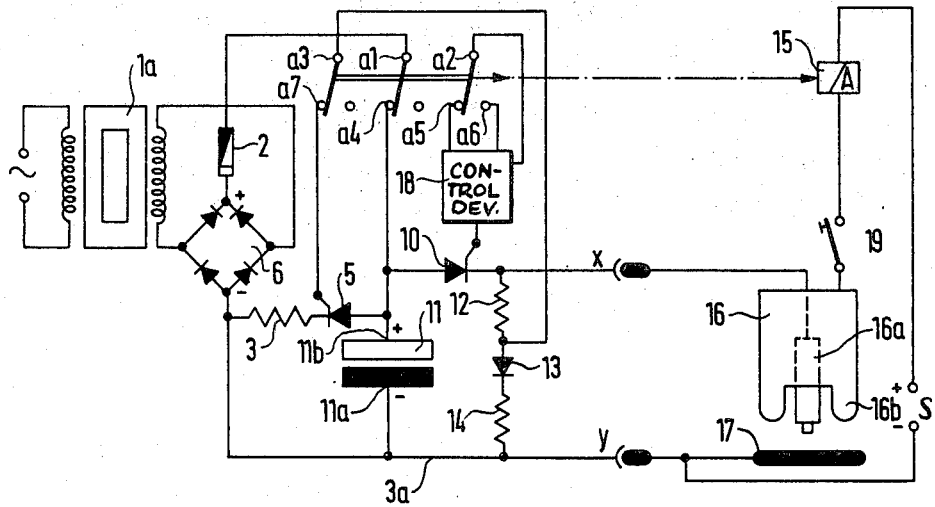
FIG. 4 is a schematic circuit diagram of yet another apparatus embodying features of the invention, wherein the transformer according to FIG. 2 is replaced substantially by a current-limiting transformer.
Figure 5:
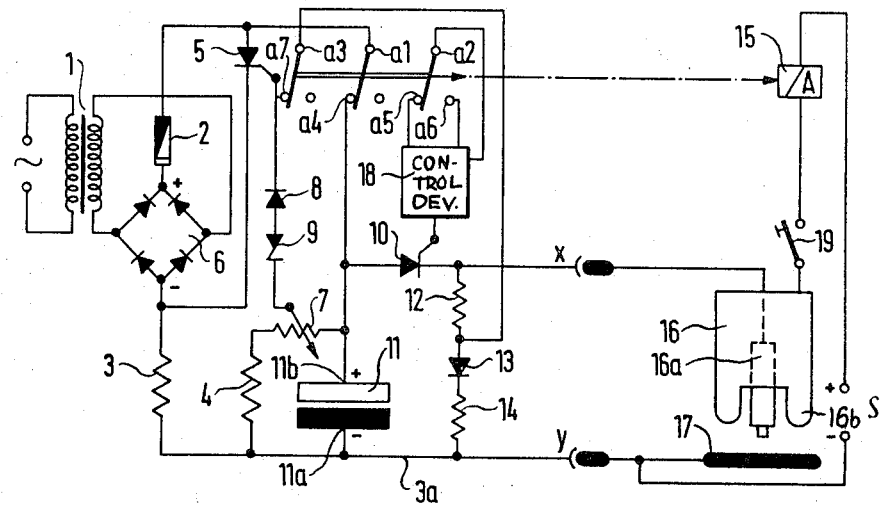
FIG. 5 is another schematic diagram illustrating an apparatus embodying features of the invention, which embodiment is similar to that of FIG. 3 but where overload protection is provided.

Another embodiment is illustrated in FIG. 4. The latter uses the advantages of the current-limiting transformer $1a$. This embodiment is similar to FIG. 3. However, the anode of thyristor 5 here is connected directly to the terminal $11b$ of the capacitor battery 11. It is connected between the cathode of thyristor 5 in the negative terminal of the rectifier bridge 6. In FIG. 4, the current flow through the elements $a1$ and $a4$ is limited to a relatively small charging current. This is particularly important for preventing damage to the armature $a1$ and the contact $a4$. The discharge currents of the capacitor battery 11, which is necessary for operation of the safety circuit, flows through the thyristor 5 and discharge resistance 3 exclusively. This discharge circuit need carry only the emergency discharge current and not the regular discharge current. Thus, resistance 3 may be made smaller than if it had to carry the welding current. In addition to these structural advantages, the circuit of FIG. 4 discharges the capacitor battery very rapidly. FIG. 5 illustrates an embodiment which combines a safety circuit with an overload protection system for the capacitor battery. For this purpose, a voltage divider circuit composed of resistors 4 and 7 shunts the capacitor battery 11. The voltage divider appears between the resistance 3 and the terminal $11b$. The resistor 7 is in the form of a potentiometer. In addition, a diode 8 and Zener diode 9 carry the voltage appearing at the tap of potentiometer type resistor 7 to the control electrode of the thyristor 5. The circuit of FIG. 5 otherwise corresponds to the circuit of FIG. 3.

The circuit of FIG. 5 also operates in a manner similar to that of FIG. 3. However, here the thyristor 5 receives its control voltage from the voltage divider composed of resistors 4 and 7 through the diode 8 and Zener diode 9. The thyristor 5 is ignited when the voltage at the tap of resistor 7 is sufficiently high to cause the voltage across the Zener diode to exceed its breakdown potential. The breakdown voltage of the Zener diode and the setting of the voltage divider are chosen so that the Zener diode breaks down when the charging voltage of the capacitor battery 11 attains a predetermined maximum admissible value.

This circuit affords not only the possibilities of dimensioning the components favorably, it also avoids initiating the danger of an accidental breakdown of thyristor 10, due to overloading of the capacitor battery 11 to an excessive voltage.

According to another embodiment of the invention the transformer 1 of FIG. 5 is replaced by a current-limiting transformer so that the aforementioned advantages of such a transformer can be obtained.

Figure 6:
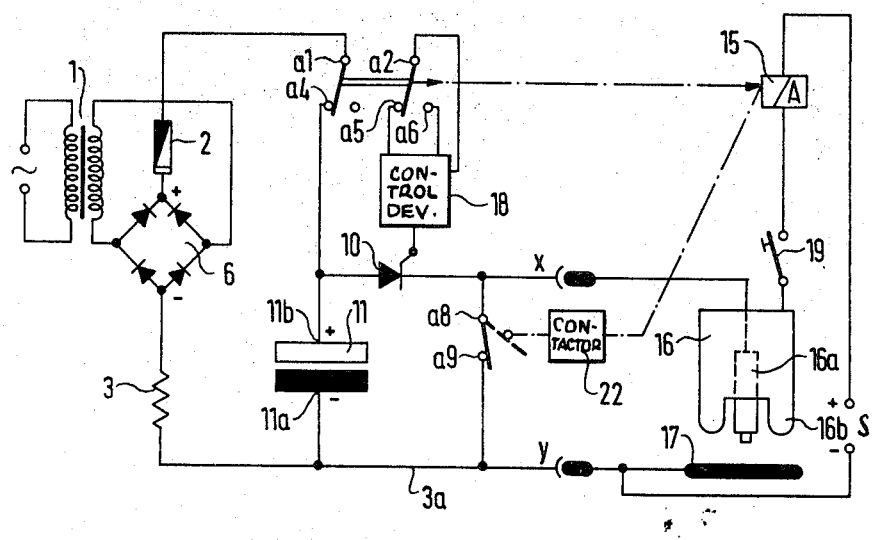
FIG. 6 is a schematic diagram of yet another apparatus embodying features of the invention.

The embodiment of FIG. 6 is substantially similar to that of FIG. 1. However, FIG. 6 differs from FIG. 1 in that the shunt circuit formed by the armature $a3$ and contact $a7$ is missing. Instead, an armature $a8$ and contact $a9$ forming part of a contactor 22 forms a shunt between the electrode terminals or lines $x$ and $y$ when the apparatus is disconnected. According to one embodiment of the invention, the contactor 22 is controlled by the control switch 19.

The circuit of FIG. 6 operates as follows.

With the control switch open, relay 15 and contactor 22 are unenergized. In that condition, the armatures $a1$, $a2$ and $a8$ contact the contacts $a4$, $a5$ and $a9$. Thyristor 10 is non-conductive or blocked. The capacitor battery 11 charges over resistance 3 and armature $a1$ resting against contact $a4$. Current is supplied by the bridge 6. Placing of the gun 16 on workpiece 17 after charging is completed, and closing control switch 19, energizes contactor 22 and opens the switch formed by armature $a8$ and contact $a9$. This removes the shunt across the plugs or terminals $x$ and $y$. This action also energizes relay 15. Thus, armature $a2$ contacts the contact $a6$ and ignites the thyristor 10. The capacitor battery 11 discharges through stud $16a$ so as to weld this stud to the workpiece 17.

If, accidently, the thyristor 10 remains conductive after switch 19 has opened, or if thyristor 10 accidently becomes conductive while the capacitor battery is being charged, the current from the bridge 6 flows through the fuse 2, the armature $a1$, the contact $a4$, the closed elements $a8$ and $a9$ and resistance 3 to the negative pole of the bridge. Thus, the capacitor battery cannot be charged at all and no voltage is formed between the electrode plugs or terminals $x$ and $y$. If the capacitor battery 11 is already completely or partly charged when the thyristor 10 accidently becomes conductive, it discharges through the armature $a8$ and contact $a9$ without forming a voltage between the electrode lines $x$ and $y$.

The armature $a8$ and contact $a9$, while they must carry the current from the bridge 6 and the capacitor battery 11, need not switch these currents. Therefore, they need be constructed only to carry these currents. Of course, care must be taken to assure that when the relay 15 trips, the switch formed by armature $a8$ and contact $a9$ is open before the thyristor becomes conductive.

FIGS. 1 to 6 illustrate the capacitor bank or battery 11 as a single capacitor. However, it should be understood that the capacitor in the figures represents the battery or bank.

FIGS. 1 to 6 also illustrate the welding gun as having an electrode 16b. This, in effect, constitutes the legs of the welding gun which serve for closing the circuit to the switch 19. The welding electrode per se is composed of the electrode 16a and the stud which contacts the electrode 17.

While embodiments of the invention have been described in detail, it will be obvious to those skilled in the art that the invention may be embodied otherwise without departing from its spirit and scope.

What is claimed is:

1. A stud welding apparatus, comprising capacitor means, charging means coupled to said capacitor means for charging said capacitor means, welding means, electronic switch means connecting said welding means to said capacitor means and capable of being rendered conductive and non-conductive for selectively discharging said capacitor means through said welding means, control means coupled to said switch means and variable between a first state and a second state for actuating said electronic switch means in the first state so as to render said switch means conductive and initiate welding, and protective means responsive to the conductivity of said switch means and the state of said control means and coupled to said capacitor means for reducing the voltage across said capacitor means when said switch means is conductive and when said control means is in the second state.

2. An apparatus as in claim 1, wherein said protective means includes voltage abating means coupled to said charging means for reducing the voltage applied by said charging means across said capacitor means.

3. An apparatus as in claim 2, wherein said protective means includes shunting means responsive to said switch means being conductive and said control means being in the second state for forming a shunt path through which said capacitor means can discharge.

4. An apparatus as in claim 2, wherein said protective means includes circuit means for forming a current path across said supply unit and including said electronic switch means, said circuit means including a cutoff device for responding to current through said circuit means, said cutoff device being connected to said capacitor means for cutting off the current to said capacitor means when said current device is cut off.

5. A stud welding apparatus, comprising welding current generating means including capacitor means, charging means coupled to said capacitor means for charging said capacitor means, welding means, said generating means including electronic switch means connecting said capacitor means to said welding means and capable of being rendered conductive and non-conductive for selectively discharging said capacitor means through said welding means, control means coupled to said switch means and variable between a first state and a second state for actuating said switch means in the first state so as to render said switch means conductive and initiate welding, and protective means responsive to the conductivity of said switch means and the state of said control means and coupled to said generating means for reducing the voltage across said capacitor means when said switch means is conductive and when said control means is in the second state.

6. An apparatus as in claim 5, wherein said protective means includes voltage abating means coupled to said charging means for reducing the voltage applied by said charging means across said capacitor means.

7. An apparatus as in claim 6, wherein said protective means includes shunting means responsive to said switch means being conductive and said control means being in the second state for forming a shunt path through which said capacitor means can discharge.

8. An apparatus as in claim 6, wherein said protective means includes circuit means for forming a current path across said supply unit and including said electronic switch means, said circuit means including a cutoff device for responding to current through said circuit means, said cutoff device being connected to said capacitor means for cutting off the current to said capacitor means when said current device is cut off.

9. An apparatus as in claim 6, wherein said protective means includes sensor means sensing the voltage applied to said welding means, safety switch means responsive to said control means being in the second state and the existence of a predetermined voltage at said welding means for shunting said charging means, said safety switch means including a disconnect element responsive to current through said safety switch for disconnecting said charging means from said capacitor means.

10. An apparatus as in claim 9, wherein said safety switch means includes a thyristor, said sensor means being connected to said thyristor for turning said thyristor on when said sensor means senses a potential greater than a predetermined potential, said sensor means sensing a potential when said electronic switch means is conductive, said control means disconnecting said thyristor from said sensor means in the first state.

11. An apparatus as in claim 10, wherein protective means includes shunting means responsive to said switch means being conductive and said control means being in the second state for forming a shunt path through which said capacitor means can discharge.

12. An apparatus as in claim 11, wherein said charging means includes a series resistance, and wherein said path includes said series resistance.

13. An apparatus as in claim 12, wherein said protective means further includes overload means responsive to the voltage across said capacitor means and including comparator means for applying a signal to said safety switch means when the voltage across said capacitor means exceeds a predetermined value determined by said capacitor means.

14. An apparatus as in claim 10, wherein said safety switch means forms a shunt path across said charging means, said electronic switch means being outside of said path.

15. An apparatus as in claim 10, wherein said protective means further includes overload means responsive to the voltage across said capacitor means and including comparator means for applying a signal to said safety switch means when the voltage across said capacitor means exceeds a predetermined value determined by said capacitor means.

16. An apparatus as in claim 9, wherein said cutoff element is a fuse.

17. An apparatus as in claim 16, wherein said protective means further includes overload means responsive to the voltage across said capacitor means and including comparator means for applying a signal to said safety switch means when the voltage across said capacitor means exceeds a predetermined value determined by said capacitor means.

18. An apparatus as in claim 9, wherein said safety switch means forms a shunt path across said charging means, said electronic switch means being outside of said path.

19. An apparatus as in claim 18, wherein protective means includes shunting means responsive to said switch means being conductive and said control means being in the second state for forming a shunt path through which said capacitor means can discharge.

20. An apparatus as in claim 9, wherein said protective means further includes overload means responsive to the voltage across said capacitor means and including comparator means for applying a signal to said safety switch means when the voltage across said capacitor means exceeds a predetermined value determined by said capacitor means.

21. An apparatus as in claim 5, wherein said protective means includes an auxiliary switch connected across said welding means and responsive to the state of said control means for shunting said welding means when said control means is in the second state.

22. A stud welding apparatus as in claim 21, wherein said protective means includes circuit means for forming a current path across said charging means and including said electronic switch means, said circuit means including a cutoff device for responding to current through said circuit means, said cutoff device being connected to said capacitor means for cutting off the current to said capacitor means when said cut off device is cut off.

23. An apparatus as in claim 5, wherein said charging means includes a current-limiting transformer and a rectifier circuit.

24. An apparatus as in claim 23 wherein said protective means includes voltage abating means coupled to said charging means for reducing the voltage applied by said charging means across said capacitor means.

25. An apparatus as in claim 24, wherein said protective means includes shunting means responsive to said switch means being conductive and said control means being in the second state for forming a shunt path through which said capacitor means can discharge.

26. An apparatus as in claim 23, wherein said protective means includes sensor means sensing the voltage applied to said welding means, safety switch means responsive to said control means being in the second state and the existence of a predetermined voltage at said welding means for shunting said charging means, said safety switch means including a disconnect element responsive to current through said safety switch for disconnecting said charging means from said capacitor means.

27. An apparatus as in claim 23, wherein said safety switch means includes a thyristor, said sensor means being connected to said thyristor for turning said thyristor on when said sensor means senses a potential greater than a predetermined potential, said sensor means sensing a potential when said electronic switch means is conductive, said control means disconnecting said thyristor from said sensor means in the first state.

28. An apparatus as in claim 23, wherein said charging means includes a series resistance, and wherein said path includes said series resistance.

29. An apparatus as in claim 23, wherein said transformer includes a primary winding and a secondary winding loosely coupled with said primary winding and having a core to form a leakage reactive transformer.

* * * * *